United States Patent [19]
Thomas

[11] Patent Number: 5,457,497
[45] Date of Patent: Oct. 10, 1995

[54] METHOD AND APPARATUS FOR VIDEO SIGNAL BANDWIDTH REDUCTION WITH HIGH QUALITY COMPATIBLE SIGNAL

[75] Inventor: Graham A. Thomas, Heathfield, United Kingdom

[73] Assignee: British Broadcasting Corporation, London, United Kingdom

[21] Appl. No.: 969,851

[22] PCT Filed: May 15, 1992

[86] PCT No.: PCT/GB92/00884

§ 371 Date: Mar. 8, 1993

§ 102(e) Date: Mar. 8, 1993

[87] PCT Pub. No.: WO92/21215

PCT Pub. Date: Nov. 26, 1992

[30] Foreign Application Priority Data

May 15, 1991 [GB] United Kingdom .................... 9110639

[51] Int. Cl.⁶ .......................................................... H04N 7/46
[52] U.S. Cl. .......................... 348/425; 348/398; 348/429; 348/431
[58] Field of Search .................................. 348/398, 426, 348/425, 429, 431; H04N 7/137

[56] References Cited

U.S. PATENT DOCUMENTS

| | | | |
|---|---|---|---|
| 4,001,045 | 1/1977 | Smith. | |
| 4,244,221 | 1/1981 | Scott. | |
| 4,499,330 | 2/1985 | Pustell. | |
| 4,985,767 | 1/1991 | Haghiri | 348/429 |
| 5,008,746 | 4/1991 | Bernard et al. | 358/429 |
| 5,068,727 | 11/1991 | Haghiri | 348/412 |

FOREIGN PATENT DOCUMENTS

| | | |
|---|---|---|
| 0299703 | 1/1989 | European Pat. Off. . |
| 0347325 | 12/1989 | European Pat. Off. . |
| 1386837 | 6/1973 | United Kingdom . |
| WO90/00846 | 1/1990 | WIPO . |
| WO90/13203 | 11/1990 | WIPO . |

OTHER PUBLICATIONS

Wang, Feng-Ming, et al., "Time Recursive Deinterlacing for IDTV and Pyramid Coding", IEEE International Symposium on Circuits and Systems, vol. 2, 1990, pp. 1306–1309.

Isnardi, M. A., et al., "Encoding for Compatability and Recoverability in the ACTV System", IEEE Transactions on Broadcasting, vol. BC–33, No. 4, Dec. 1988, pp. 116–123.

*Primary Examiner*—Howard W. Britton
*Attorney, Agent, or Firm*—Kevin J. Fournier

[57] ABSTRACT

A temporally-subsampled video signal from a bandwidth reduction encoder is processed prior to transmission in order to reduce the judder effects that would otherwise be present when the encoded signal was viewed directly on a receiver not equipped with a bandwidth reduction decoder. A fraction 1/N of the samples are transmitted in the first field of each group of N fields, where N is the temporal subsampling ratio. Each of the other N-1 fields is formed by projecting the first field along the estimated motion trajectory to the appropriate time instant and adding to this projection the difference between another group of the N/1 samples and an estimate of these samples derived from those transmitted in the first field. At the decoder, the projected fields and the estimate of the samples can be derived from the samples in the first transmitted field of the group for each subsequent field. Using this information, the values of the other sets of samples can be derived from the subsequent transmitted fields, yielding the original temporally-subsampled signal. This signal is then decoded by the bandwidth reduction decoder.

15 Claims, 6 Drawing Sheets

METHOD AND APPARATUS FOR VIDEO SIGNAL BANDWIDTH REDUCTION WITH HIGH QUALITY COMPATIBLE SIGNAL

FIELD OF THE INVENTION

This invention relates to methods and apparatus of bandwidth reduction of video signals; more specifically but not exclusively, it is concerned with methods and apparatus in which the bandwidth-reduced signal should resemble closely a conventional television signal such as MAC, PAL, SECAM or NTSC. Such methods can be used, for example, for the bandwidth reduction of high definition television (HDTV) signals so that they may be transmitted in a conventional channel or recorded on media intended for conventional signals.

BACKGROUND TO THE INVENTION

The invention is concerned with a method for improving the 'compatibility' of the bandwidth-reduced signal in systems using a coding method that performs temporal subsampling of the signal. Examples of bandwidth reduction systems to which this could be applied are given in our UK patent applications GB-A-2221367 and GB-A-2188509 and in IEE conference publication no: 293. IBC, 1988, September 1988 which contains various papers on High Definition MAC (HD-MAC). Such systems generally use the principle of digitally assisted television (DATV), in which the picture information is sent as an analogue signal but a digital signal is also transmitted whose task is to control the high definition decoder.

The invention will be described with reference to the so-called '40 mS branch' coding algorithm which is described in the aforementioned conference publications, for example in the paper therein entitled 'motion compensated interpolation techniques for HD-MAC' by J. P. Arragon, F. Fonsalas, M. Haghiri, although it can be applied to any branch which works by temporally subsampling the video signal (such as the 80 ms branch described in GB-A-2221367 and the Arragon et al. paper). It may be applied to a bandwidth reduction system having only one coding method or 'branch', or one in which several branches are available and are switched on a block-by-block basis such as is disclosed, for example in WO88/00783.

Before describing the invention in detail, the operation of the 40 mS coding branch will be reviewed. The 40 mS branch encoder spatially pre-filters the incoming video signal and subsamples alternate fields; in a 50 Hz television system the sub-sampled images are separated in time by 40 mS, hence the name given to this branch. Motion vectors are derived at the encoder to indicate how the images that were not sampled may be derived from the adjacent sampled images. The subsampled video signal is then transmitted to the decoder, where the alternate subsampled images are reconstructed using a spatial interpolator. The non-transmitted images are then derived by motion-compensated temporal interpolation.

In a simple embodiment of a 40 ms branch, the sub-sampled pixels in each alternate image are transmitted over two field periods; half the samples being transmitted in each field. FIG. 1 shows the pixels sampled by the branch and the positions at which they are transmitted. The samples on odd lines of the original field 1 are shown being transmitted in the first field and those from even lines in the second field. This produces a compatible signal that appears to 'judder' at 25 Hz, since alternate fields of samples are transmitted one field period later than they should be.

DESCRIPTION OF PRIOR ART

Previous workers (in the Eureka 95 KDTV project) have addressed the problem of judder by forming the second transmitted field of each pair from a linear combination of the second half of the samples and an image derived by projecting the preceding field along the motion trajectory specified by the corresponding motion vector (generally each block in the image will have its own vector). We can write this as transmitted field 1=samples from odd lines or original field transmitted field 2=a×(projected transmitted field 1) +(1−a)×(samples from even lines of original field)

where a is the fraction of the projected field used. This reduces to the simple embodiment described above when a=0. The effect of this on the compatible picture is to reduce the level of judder but not to eliminate it completely, since a fraction (1−a) of the signal is still displayed in the wrong position. The decoder can recover the samples from the even lines of the original image by calculating the projected field 1 from the transmitted field 1 and the motion vectors and subtracting a fraction a of it from the received field 2, then scaling the result by (1−a). The only disadvantage for the viewer using a decoder is that the effect of channel noise is increased by a factor 1/(1−a)

in half the samples. The fraction a is generally a function of motion speed and detail content of transmitted field 1, so that an optimum tradeoff can be reached between judder in the compatible picture and noise in the decoded picture.

Another possible method of reducing judder in the compatible picture is described in GB-A-2221367. This method is called motion-compensated sample repositioning; although GB-A-2221367 describes this in terms of a 80 mS coding branch which subsamples one in four fields of a 50 Hz input signal, the principle may be applied to a coding branch with other temporal subsampling ratios such as the 40 mS branch described above. In this method of judder reduction, the transmitted fields that are not co-timed with the sampled field are formed by projecting the samples to be transmitted along the motion trajectory so that they are positioned in approximately the correct place. A small amount of judder remains, since the samples can only be moved an integer number of sampling sites (in the case of an 80 mS branch, the sample repositioning can only be done to the nearest even number of sample spacings). Another problem with this approach is that samples may be lost in areas adjacent to blocks having different motion vectors or blocks sent using another coding branch.

The present invention aims to overcome the disadvantages of the prior art methods described. The invention is defined by the independent claims to which reference should be made.

DESCRIPTION OF THE DRAWINGS

An embodiment of the invention will now be described, by way of example, and with reference to the accompanying drawings, in which.

DESCRIPTION OF BEST MODE

Figure 2A:
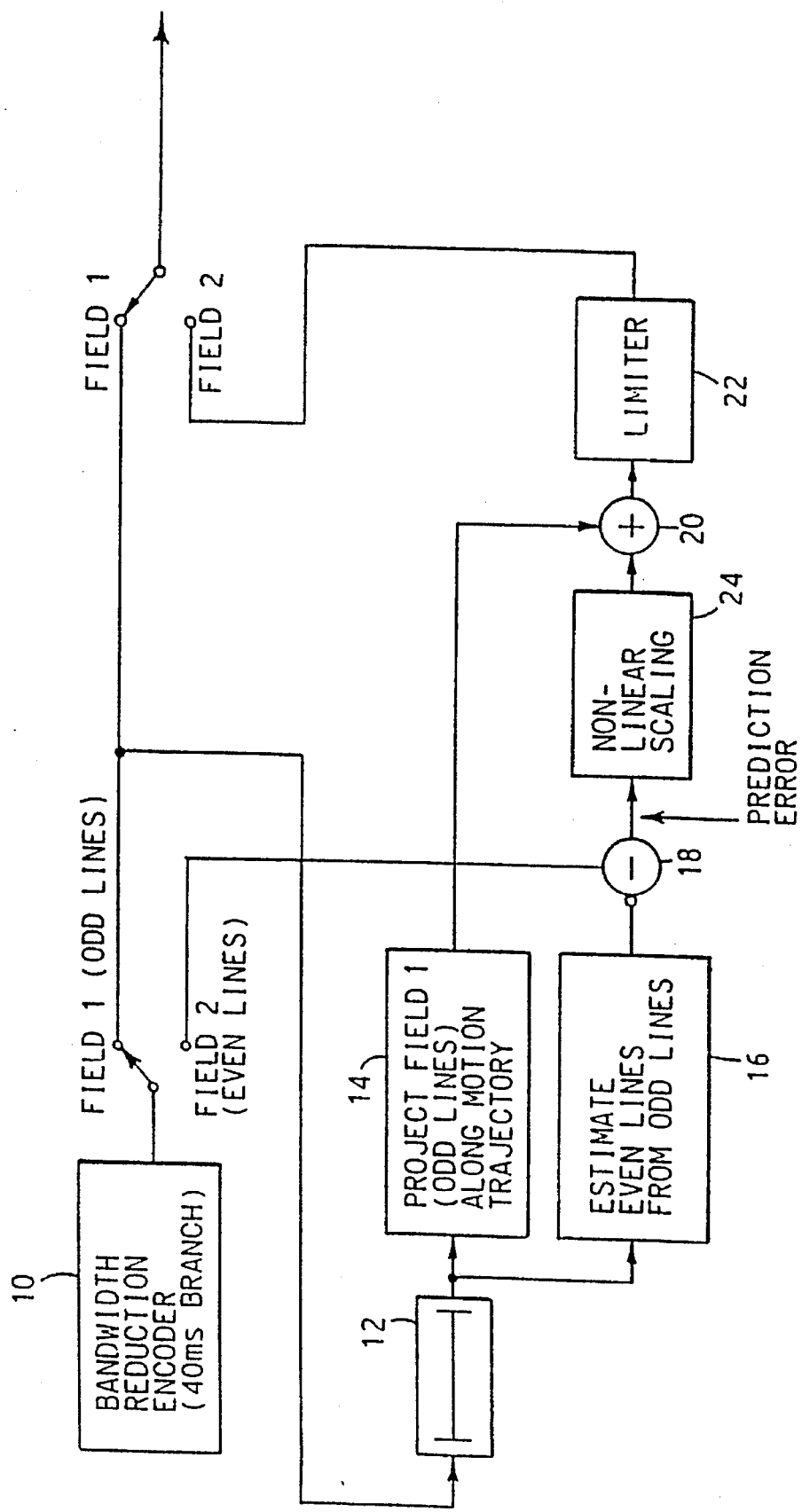
FIG. 2(a) is a block schematic diagram of an encoder embodying the invention.

In the encoder of FIG. 2(a) a 40 mS branch of a bandwidth reduction encoder 10 has a switched output switch at field rate. Odd lines of a sampled image occurring in the first field form the first field of the bandwidth reduced compatible signal for transmission or recording.

Figure 1:
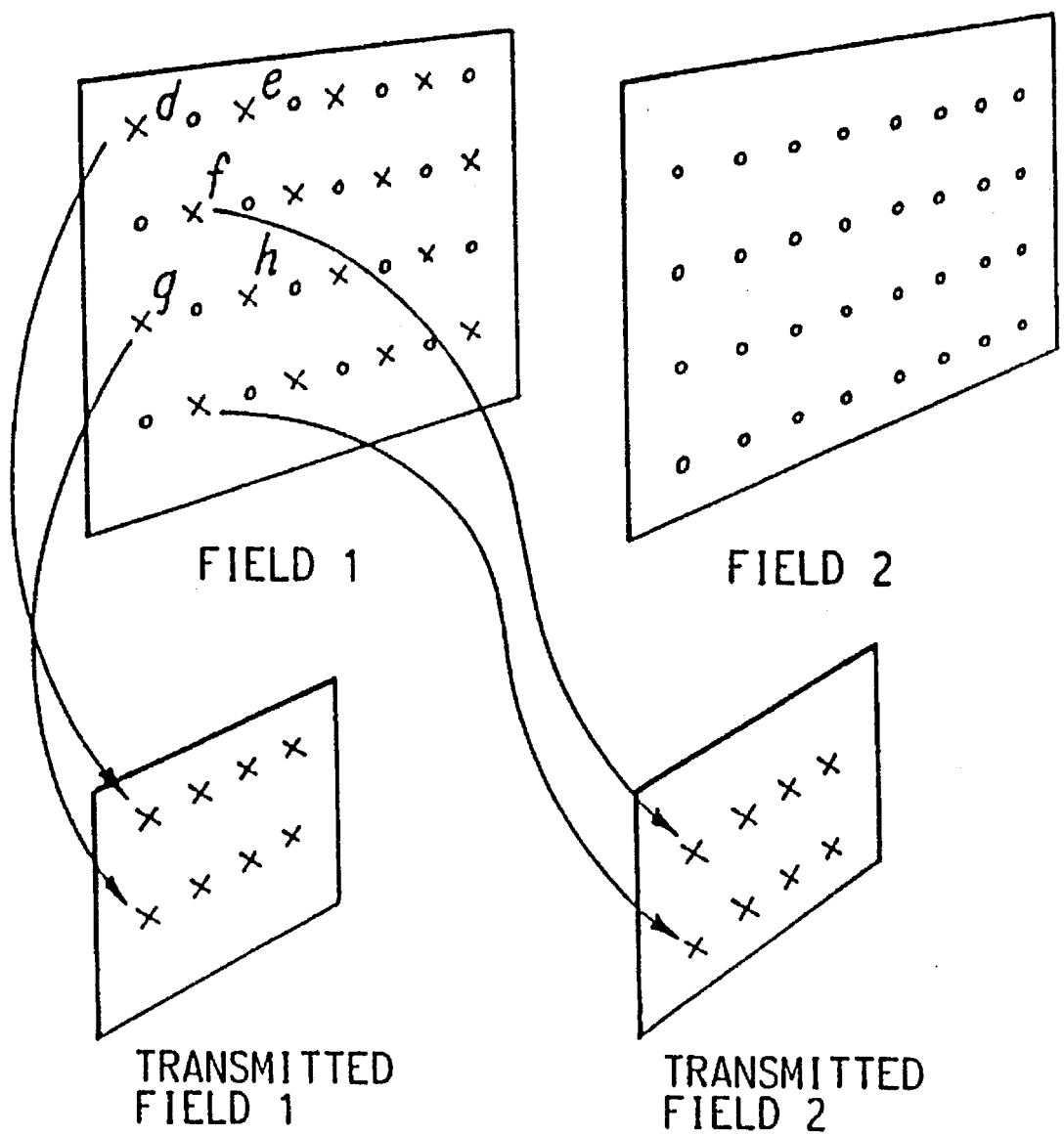
FIG. 1 illustrates the operation of a simple 40 mS coding branch.

An estimate of the samples from the even lines of the image is formed using a spatial interpolator operating on the samples transmitted in field 1. This may be a simple average of adjacent samples, or could be a more sophisticated two-dimensional low-pass filter. For example, in the case of sample f in FIG. 1, $$est(f)=(d+e+g+h)/4$$

where est(f) is the estimate for sample f, and d,e,g,h are the values of the neighbouring samples in the adjacent lines as shown in FIG. 1

Secondly, a 'prediction error' is calculated by subtracting this estimate from the even line samples:

$$pe(f)=f-est(f)$$

Thus, in FIG. 2(a) the samples of the odd lines are delayed by a field delay 12 and then applied to a device 14 which projects the odd field lines along the motion trajectory and to a device 16 which forms an estimate of the even lines from the odd lines. This estimate is then subtracted by subtracter 18 from the lines of field 2 to form a prediction error which is then added to the projected transmitted field 1 at adder 20.

Thus, we can write:

transmitted field 1=samples from odd lines of original field transmitted field 2=(projected transmitted field 1)+ prediction error Unlike the prior art solutions described above, the projected field is used at full amplitude and is not attenuated by a factor a as described earlier. Since the prediction error signal is generally of low amplitude and contains mainly high spatial frequencies, little or no subjective impairment is caused by adding it to the projected field.

The signal formed by adding the prediction error to the projected field may have an amplitude greater than the maximum that can be transmitted, since both the projected field and the prediction error may have an amplitude equal to the maximum signal amplitude. Thus it is necessary to limit the signal transmitted in field 2 to within the allowable range. This is shown by limiter 22 in FIG. 2(a).

Figure 3:
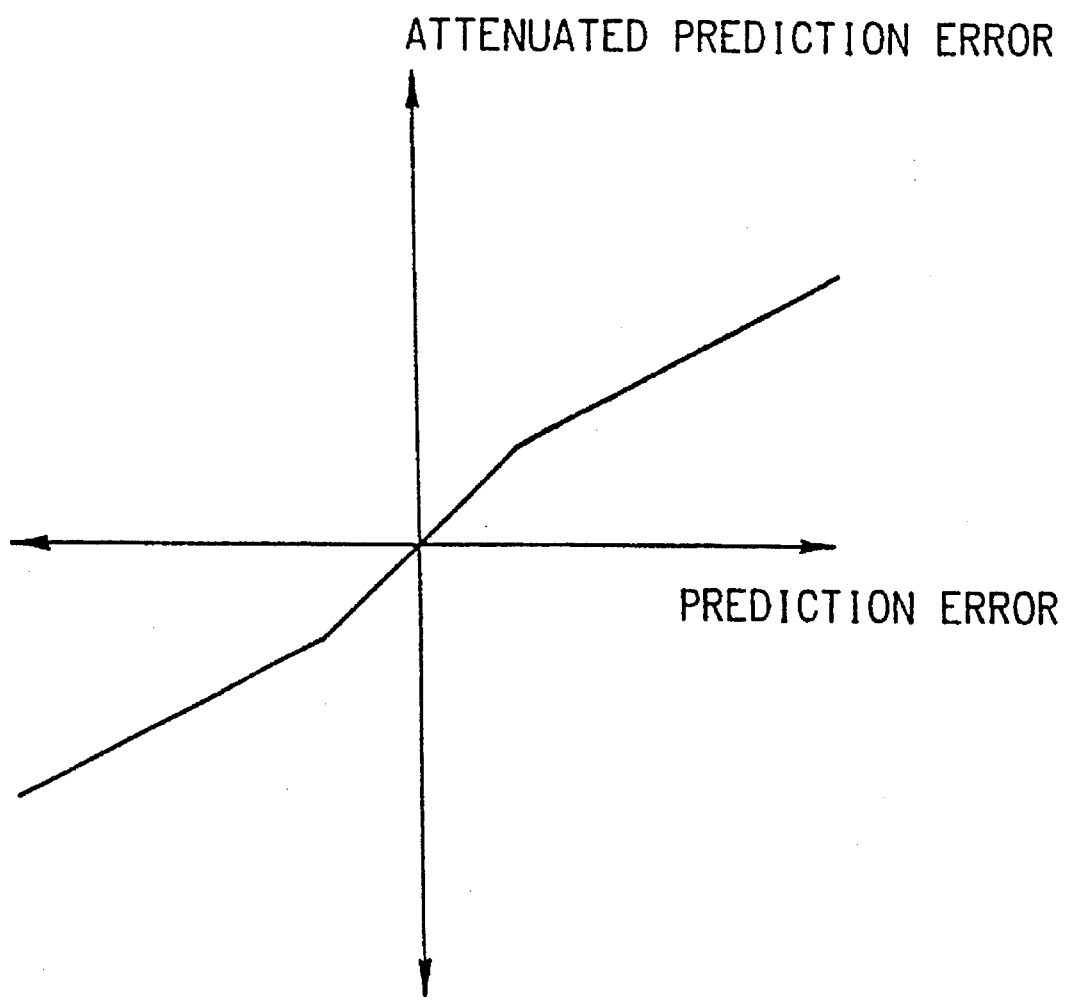
FIG. 3 is an example of a possible form of a non-linear attenuation function for scaling a prediction error at the encoder.

In order to reduce potential problems caused by limiting the transmitted signal and to reduce the visibility of the coding error signal in the compatible picture, the prediction error may be attenuated prior to transmission. There is some advantage in using a non-linear attenuation function which reduces the amplitude of large prediction errors by a larger factor than small errors. Such a function will reduce problems of limiting and coding error visibility without giving a significant noise penalty in the decoded pictures; this is because noise signals will tend to be of a low amplitude and so will not be subjected to a high gain in the decoder when the inverse non-linearity is applied. In an embodiment of the invention using a non-linearity, we can write transmitted field 2=(projected transmitted field 1)+ atten (prediction error)

where atten(..) is an attenuation function, which may be non-linear. FIG. 3 shows an example of a possible form for this function. The non-linear attenuator 24 is shown in FIG. 2(a) as operating on the prediction error signal prior to addition to the projected transmitted field.

Figure 2B:
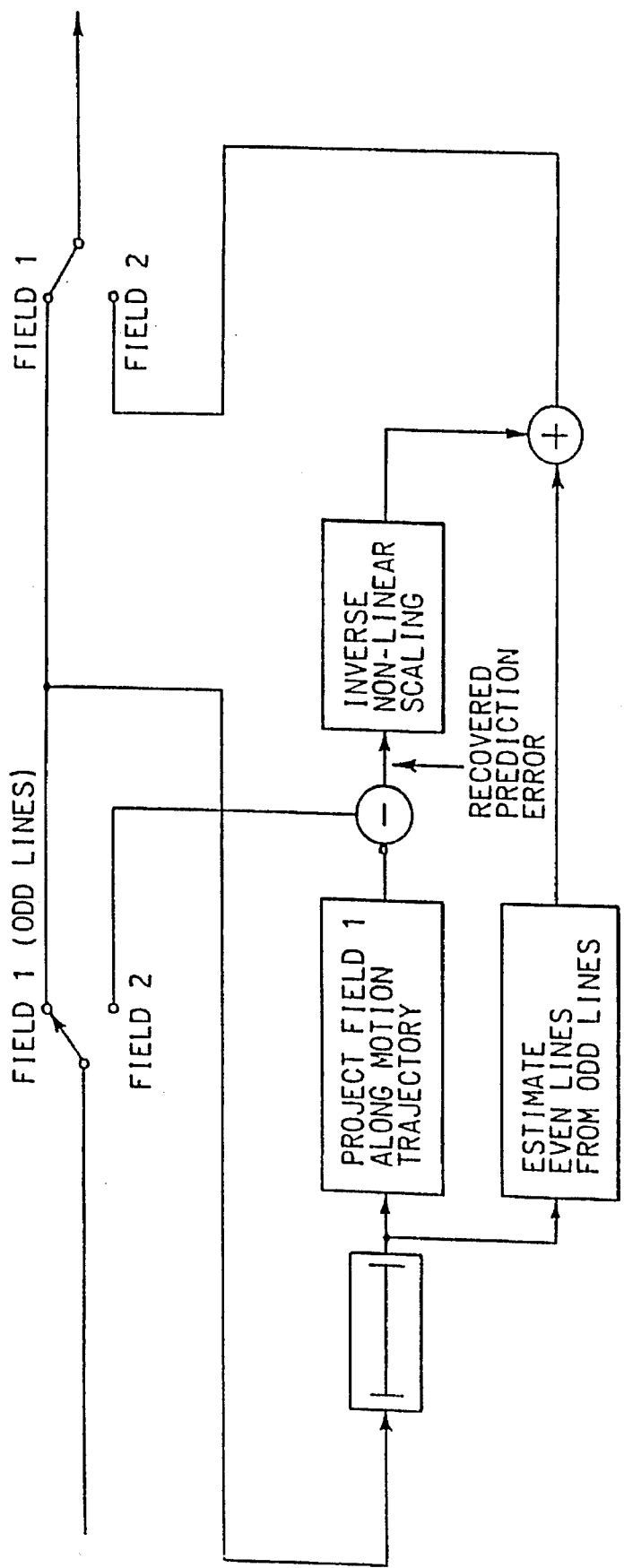
FIG. 2(b) is a block schematic diagram of a corresponding decoder embodying the invention.

At the decoder shown in FIG. 2(b) the projected field 1 is derived in the same way as at the encoder, using the transmitted field 1 and the motion vectors. This projected field is subtracted from the received field 2, yielding the prediction error. This error is then subject to the inverse of the non-linear scaling function, if any. The predicted value of samples in even lines of the original image is formed from the samples of the odd lines transmitted in field 1, as at the encoder. The prediction error is added to the prediction, yielding the sample values from the even lines of the original image. These sample values are then passed to the main decoding process, which typically will consist of spatial interpolation and motion-compensated temporal interpolation, as described in the various publications referred to. The operation of the decoder can be summarised as follows:

recovered samples from odd lines of original image= received field 1 recovered samples from even lines of original image= prediction error+estimate of even lines where prediction error=inverse atten (received field 2–projected field 1)

estimate of even lines of original image=interpolated version of received field 1 and projected field 1=received field 1 projected by received vectors inverse atten ( . . . ) is the inverse of the non-linear attenuation function used at the encoder.

A more sophisticated embodiment of the invention could use the technique known as sub-band coding to divide the spatial frequency domain of the sampled images into a number of regions (two in the case of the 40 mS branch described here). Sub-band coding is a well-known technique which allows a signal to be split into two or more signals sampled at a lower rate, in such a way that the sampled signals may be up-sampled, filtered and added together to reconstitute the original signal. Samples from the sub-band corresponding to the lower spatial frequencies would be transmitted in field 1 and samples of the upper sub-band would be transmitted in the same way as the prediction error described above.

Figure 4A:
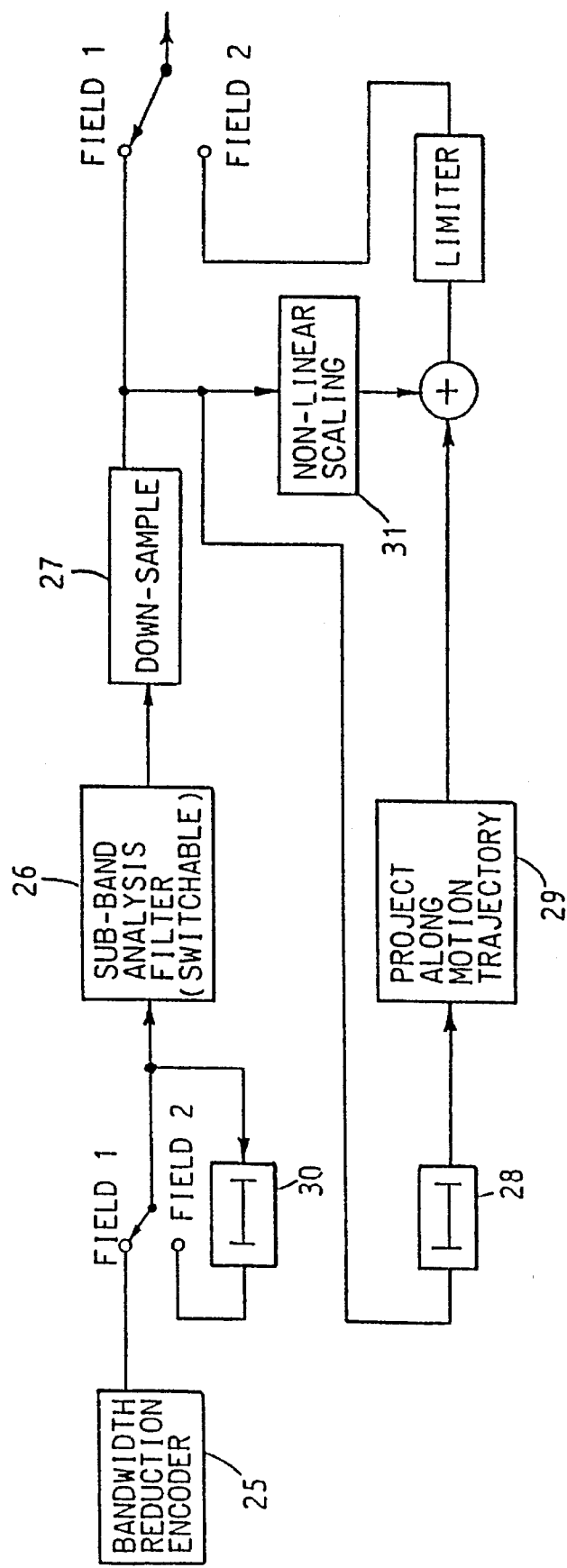
FIG. 4(a) is a block schematic diagram of an encoder embodying a further embodiment of the invention.

An encoder corresponding to this embodiment of the invention is shown in FIG. 4(a). The bandwidth reduction encoder 25 is assumed to output temporally sub-sampled images during field 1 and nothing during field 2, unlike the encoder 10 in FIG. 2(a) which was assumed to have included circuitry to delay the even lines of the sub-sampled image and output them during field 2. The sub-sampled image is filtered with a low-pass sub-band analysis filter 26, whose output is down-sampled by a factor of 2 by down-sampler 27. The filter 26 is switchable; it operates as a low-pass sub-band analysis filter on field 1 and as a high-pass filter on the following field. The filtering and down-sampling may be two-dimensional, for example to convert the quincunxial samples of the temporally-sub-sampled input field 1 shown in FIG. 1 to the orthogonal sampling lattice of the transmitted field 1. The resulting image is transmitted during field 1 and is also delayed by one field period by the delay 28 and projected along the estimated motion trajectory by the projector 29 to form a contribution to the signal to be transmitted in field 2.

During field 2, the sub-band analysis filter 26 operates as a high-pass filter on the re-circulated image signal from the delay 30. The signal it generates is added to the projected signal after optional non-linear scaling by the scaler 31. The combined signal is limited to be within the allowed signal range before being output during field 2.

Figure 4B:
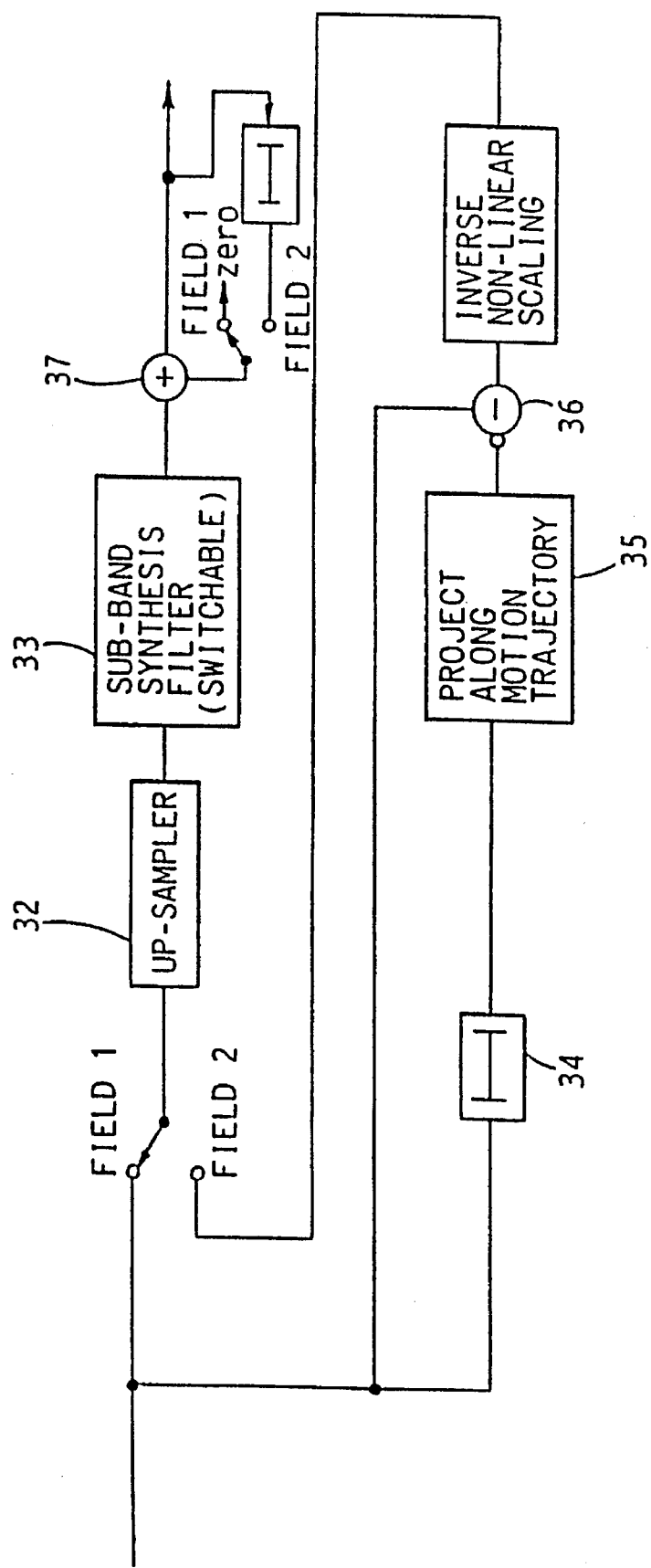
FIG. 4(b) is a block schematic diagram of a decoder corresponding to the encoder of FIG. 4(a).

A diagram of a decoder corresponding to this version of the invention is shown FIG. 4(b). The signal received during field 1 (that consists of the low-frequency sub-band) is up-sampled by a factor of 2 by an up-sampler 32 and filtered by the switchable synthesis filter 33 operating as a low-pass synthesis filter. The received signal is also delayed by a field delay 34 and then projected along the motion trajectory to the time corresponding to field 2 by a projector 35. The projected field is then subtracted from the received field 2 by a subtractor 36 to yield the recovered high sub-band signal. The signal is subjected to inverse non-linear scaling (if used at the encoder) before up-sampling and filtering by the synthesis filter 33 switched to operate as a high-pass synthesis filter. The filtered high-pass signal is added to the delayed filtered low-pass signal by the adder 37, to yield the recovered temporally sub-sampled field which is then passed to the bandwidth reduction decoder. In this figure it is assumed that the bandwidth reduction decoder expects to receive all samples of the temporally-sub-sampled field during field 2, whereas the bandwidth reduction decoder fed by the circuitry of FIG. 2(b) expects to receive the odd and even lines of the temporally-sub-sampled field during two transmission field periods. These differences are not significant.

The advantage of this more sophisticated version of the invention is that the transmitted field 1 (and signals is subsequent field produced by projecting field 1) contains less aliasing than in the embodiment described earlier, since a low-pass filter is used before sub-sampling the signal. This will give a further improved compatible picture quality, but will have no effect on the decoded picture. The disadvantage of this approach is that the circuitry is more complex, since the sub-band analysis and synthesis filters will generally be more complex than the predictor and subtractor which they replace in the earlier embodiment.

The relationship between the two versions can be seen by comparing FIGS. 4(a) and 2(a). If the sub-band analysis filter in FIG. 4(a) operates as a transparent filter during field 1 and the down-sampler selects samples from odd lines of the image, then the function of the circuit is the same as that of FIG. 2(a) during field 1. If the sub-band analysis filter operates by estimating even lines from odd lines and subtracting this estimate from the even lines during field 2, then the function of FIGS. 2(a) and 4(a) is the same during field 2. The same is true of FIGS. 2(b) and 4(b).

As with the first version of the invention, this version can be applied to temporal sub-sampling ratios of greater than 2:1. For example, consider a bandwidth reducer that samples one in every four images (an 80 mS coding branch). The first transmitted field of each group of four fields is formed from a sub-band representing the low quarter of the spatial frequency content of the image. For each of the subsequent three fields, the transmitted field one is projected to the corresponding time using motion vectors corresponding to movements of 1, 2 and 3 field periods. This requires the field delays 28 and 34 to re-circulate their contents during these fields. To each of these projected images is added one higher frequency sub-band, down-sampled by a factor of 4. Thus the switches shown in FIGS. 4(a) and 4(b) are set to their 'field 2' positions for fields 2, 3 and 4. The sub-band analysis and synthesis filters operate on the higher three sub-bands during these fields. The adder 37 in FIG. 4(b) accumulates the four reconstructed sub-bands to produce one complete reconstructed image every four field periods.

Various other modifications to the embodiment described are possible and will occur to those skilled in the art. The invention is not limited to 40 mS coding branches but may be applied to any branch which samples the video signal temporally. It may be applied to a system involving a single coding branch or a system in which several branches are available and are switched between in response to picture content.

I claim:

1. A method of video signal bandwidth reduction in which one or more bandwidth reduction coding methods are employed, at least one of which operates by temporally subsampling the input video signal by a factor N to form a temporally subsampled signal, comprising;

estimating motion vectors representing movement of the image to be coded, transmitting the temporally subsampled signal by transmitting a first field comprising 1/N of the samples in one out of every N fields of a group of N fields, characterised by;

forming the other N–1 transmitted fields in each group of N fields by;

projecting the first transmitted field to a time corresponding to the transmission time of each of the N–1 other fields using the motion vectors estimated during the coding process to produce a projected signal, forming a prediction of the set of samples of the input signal forming the field to be transmitted obtained from the sample values of the first transmitted field, forming a prediction error equal to the difference between the set of samples of the input signal forming the field to be transmitted and the prediction of these sample values obtained from the sample values of the first transmitted field, and adding to the projected signal the prediction error.

2. A method of bandwidth reduction according to claim 1, wherein the prediction error is subject to a non-linear function prior to addition to the projected field.

3. A method of video signal bandwidth reduction in which one or more bandwidth reduction coding methods are employed, at least one of which operates by temporally subsampling the input video signal by a factor N to form a temporally subsampled signal, comprising;

estimating motion vectors representing movement of the image to be coded, transmitting the temporally subsampled signal by transmitting a first field comprising 1/N samples obtained from a low frequency sub-band of the image in one out of every N fields, characterised by;

projecting the first transmitted field to a time corresponding to the transmission time of each of the N−1 other fields using the said estimated motion vectors and, forming the other N−1 transmitted fields in each group of N fields by adding to the projected signal a signal comprising samples from a respective one of (N−1) higher sub-bands for the following (N−1) fields.

4. A method of bandwidth reduction according to claim 3, wherein the higher sub-band signal is subject to a non-linear function prior to addition to the projected field.

5. A video signal bandwidth reduction encoder, comprising:

bandwidth reduction encoding means for reducing the bandwidth of an input video signal by one or more different coding methods, at least one of which temporally subsamples the input video signal by a factor N, and including means for deriving estimates of motion vectors representing movement of the image to be coded;

means for transmitting the temporally subsampled signal comprising means for transmitting a first field comprising 1/N of the samples in one out of every N fields of the video signal;

means for transmitting the other (N−1) fields in each group of N fields; and means for transmitting the estimated motion vectors; characterised in that the means for transmitting the other N−1 fields comprises:

means for projecting the first transmitted field to a time corresponding to the transmission time of each of the N−1 other fields using the said estimated motion vectors;

means for forming a prediction error equal to the difference between the set of samples of the input signal forming the field to be transmitted and a prediction of these sample values obtained from the sample values of the of the first transmitted field; and means for adding the projected field and the prediction error to form each of the N−1 other fields.

6. A video signal bandwidth reduction encoder according to claim 5, comprising means for subjecting the prediction error to a non-linear function prior to addition to the projected field.

7. A video signal bandwidth reduction encoder comprising:

bandwidth reduction encoding means for reducing the bandwidth of an input video signal by one or more different coding methods, at least one of which temporally subsamples the input video signal by a factor N, and including means for deriving estimates of motion vectors representing movement of the image to be coded; and means for transmitting the temporally subsampled signal comprising means for transmitting a first field comprising 1/N of the samples in one out of every N fields of the video signal, and means for transmitting in the other (N−1) fields in each group of N fields the remaining (N−1)/N of the samples in the sub-sampled field; and means for transmitting the associated motion vectors characterised in that the means for transmitting the first field comprises means for transmitting samples obtained from a low-frequency sub-band of the image; and in that the means for transmitting the other N−1 fields comprises:

means for projecting the first transmitted field to a time corresponding to the transmission time of each of the N−1 other fields using the said estimated motion vectors;

means for obtaining sample values from N−1 higher sub-bands for the following (N−1) fields; and means for adding the samples from a respective higher sub-band to the projected field.

8. A video signal bandwidth reduction encoder according to claim 7, comprising means for subjecting the sample values from a higher sub-band to a non-linear function prior to addition to the projected field.

9. A method of decoding a bandwidth reduced video signal, comprising:

receiving the video signal, the signal having been bandwidth reduced at an encoder by one or more coding methods, at least one of which operates by temporally subsampling the input video signal by a factor N, and includes estimation of motion vectors representing movement of the image to be coded;

extracting the motion vectors from the received signal;

extracting samples of a first of N fields;

recovering samples of N−1 further received fields by predicting the sample values of each of the (N−1) further fields from the sample values of the extracted field;

adding to the predicted signal a prediction error equal to the difference between the extracted received samples of the (N−1) other fields and the samples of the first field projected to a time corresponding to the reception time of each of the (N−1) other fields using the motion vectors extracted from the received signal to recover each of the remaining (N−1) sets of samples; and decoding the samples of the recovered image derived from the samples received in the N fields using a bandwidth reduction decoder complementary to the bandwidth reduction encoder used at the transmitter.

10. A method according to claim 9, comprising subjecting the prediction error to a non-linear function prior to addition to the predicted sample values.

11. A method of decoding a bandwidth reduced video signal, comprising:

receiving the video signal, the signal having been bandwidth reduced at an encoder by one or more coding methods; at least one of which operates by temporally subsampling the input video signal by a factor N, and includes estimation of motion vectors representing movement of the image to be coded;

extracting the motion vectors from the received signal;

extracting samples of a first of N fields which represent a low-frequency sub-band of the image;

recovering samples representing (N−1) higher sub-bands by projecting the first of N received fields to a time corresponding to the reception time of each of the other (N−1) fields using the motion vectors extracted from the received signal and subtracting from the projected fields the samples received in the corresponding fields to yield the (N−1) higher sub-bands;

combining the low and high sub-bands using sub-band synthesis filters to recover the encoder sub-sampled image; and decoding the samples of the recovered image using a bandwidth reduction decoder complementary to the bandwidth reduction encoder used at the transmitter.

12. Apparatus for decoding a bandwidth reduced video signal, comprising:

means for receiving the video signal, the signal having been bandwidth reduced at the encoder by one or more coding methods, at least one of which operates by temporally subsampling the input video signal by a factor M, and includes estimation of motion vectors representing movement of the image to be coded;

means for extracting the motion vectors from the received signal;

means for extracting samples of a first of N fields;

means for recovering samples of N−1 further received fields including means for predicting the sample values of each of the (N−1) further fields from the sample values of the extracted first field, and means for adding to the predicted signal a prediction error equal to the difference between the extracted received samples of the (N−1) other fields and the samples of the first field projected to a time corresponding to the reception time of each of the (N−1) further fields using the motion vectors; and means for decoding the samples of the N recovered fields using a bandwidth reduction decoder complementary to the bandwidth reduction encoder used at the transmitter.

13. A decoder according to claim 12, comprising means for subjecting the prediction error to a non-linear function prior to addition to the predicted sample values.

14. Apparatus for decoding a bandwidth reduced video signal, comprising:

means for receiving the video signal, the signal having been bandwidth reduced at an encoder by one or more coding methods; at least one of which operates by temporally subsampling the input video signal by a factor N, and includes estimation of motion vectors representing movement of the image to be coded;

means for extracting the motion vectors from the received signal;

means for extracting samples of a first of N fields which represent a low-frequency sub-band of the image;

means for recovering samples representing (N−1) higher sub-bands by projecting the first of N received fields to a time corresponding to the reception time of each of the other (N−1) fields using the motion vectors extracted from the received signal and subtracting from the projected fields the samples received in the corresponding fields to yield the (N−1) higher sub-bands;

means for combining the low and high sub-bands using sub-band synthesis filters to recover the encoded subsampled image; and means for decoding the samples of the recovered image using a bandwidth reduction decoder complementary to the bandwidth reduction encoder used at the transmitter.

15. A video signal receiver comprising apparatus according to claim 12, 13 or 14.

* * * * *